United States Patent Office 2,881,171
Patented Apr. 7, 1959

2,881,171

NEW HETEROCYCLIC COMPOUNDS, POLYMERS THEREOF AND METHODS OF MAKING THEM

Elinor M. Hankins, Philadelphia, Pa., assignor to Rohm & Haas Company, Philadelphia, Pa., a corporation of Delaware No Drawing. Application August 18, 1955
Serial No. 529,350

6 Claims. (Cl. 260—256.4)

This invention relates to new esters of acrylic and methacrylic acids which contain nitrogenous heterocyclic rings rendering the compounds susceptible to both addition polymerization and condensation reactions. Polymers obtained from such compounds and the methods of making the compounds are also part of the invention herein.

The compounds of the present invention have the structure of Formula I:

I
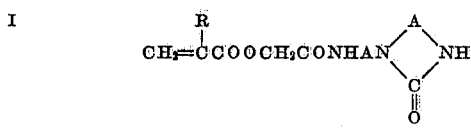

where R is selected from the group consisting of hydrogen and methyl, and A is an alkylene group having 2 to 3 carbon atoms.

They are substituted 2-imidazolidinones or substituted tetrahydro-2-pyrimidinones. Certain of them may also be conveniently named as derivatives of ethyleneurea or trimethyleneurea.

These compounds may be obtained by the reaction of an acrylate or methacrylate of Formula II with a halogenated compound of Formula III:

II        $CH_2=C(R)COOY$ where Y is a metal selected from the group consisting of silver and the alkali metals, being preferably, sodium, potassium or lithium:

III
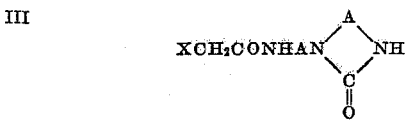

where X is selected from the group consisting of chlorine and bromine.

In this reaction, equimolar amounts of the compounds of Formulas II and III are generally used. However, an excess of the acrylic acid or methacrylic acid salt of Formula II may be present, if desired. The reaction is effected in an inert solvent, that is one that is inert to the reactants. The reactants may be introduced all at once into the solvent or one may be added after the other all at once or in a gradual manner. As solvents, there may be used acetonitrile, dimethylformamide, dioxane, t-butanol, benzene, dimethyl ether of diethylene glycol, and dimethyl sulfoxide. Of these, acetonitrile is preferred because it provides a rapid reaction, it is easily removed after completion of the reaction, and there is little risk of polymerization during reaction. Optionally, there may be added a polymerization inhibitor in an amount of 0.05 to 1% based on the total weight of the reactants. Suitable inhibitors include hydroquinone, the ethers thereof, such as its monomethyl ether, di-β-naphthol, and benzyltrimethylammonium salicylate. While it is not necessary to include the inhibitor, it is generally preferred to do so. Optionally but preferably, a catalyst for the reaction of II and III may be included in an amount of about 0.5 to 3% by weight on the total weight of the reactants. As catalysts, there may be used tertiary amines that quaternize readily, such as trimethylamine, benzyldimethylamine, pyridine or N-methyl pyrrolidine. Instead of tertiary amines, there may be used as catalysts various quaternary ammonium compounds, such as the benzyltrimethylammonium chloride, sulfate, methoxide, acetate, butoxide, salicylate, and so on, a corresponding tetramethylammonium chloride, sulfate, and so on, also choline, choline methoxide, as well as others. The use of benzyltrimethylammonium salicylate serves to provide both a catalytic function and a polymerization-inhibiting function.

The compounds of Formula III are obtained by the reaction of a compound of Formula IV with a compound of Formula V:

IV
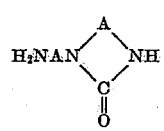

V          $XCH_2COOR'$ where R' is an alkyl group having 1 to 18 carbon atoms and is preferably methyl.

In this reaction of Compounds IV and V, about equimolar proportions of the two reactants may be used although an excess of one or the other may be present. It may be carried out in a solvent, such as methanol, at a temperature between about −10° to +10° C., preferably from 0° to −8° C. To assist in the maintenance of the temperature, it is preferred to add one of the reactants to the other, preferably a solution of the other, such solutions being in methanol or other solvent inert to the reactants. Suitable cooling means may be provided about the reaction vessel. The reaction may take from a half to seven hours or more, depending on the cooling capacity available and the amount of the reactants to be reacted. The product precipitates as a white solid which may be isolated by filtration. Additional product may be obtained by further crystallization effected by cooling the filtrate and refiltering. Purification may be effected such as by washing with methanol, acetone, or the like. The product of Formula III may then be dried before introducing it into the reaction with a compound of Formula II above.

Examples of compounds of Formula IV include N-(2-aminoethyl)-N,N'-ethyleneurea or 1-(β-aminoethyl)-2-imidazolidinone, N-(3-aminopropyl)-N,N'-trimethyleneurea or 1-(3-aminopropyl) - tetrahydro-2-pyrimidinone, 1-(β-amino-β-methyl-ethyl)-5-methyl-2-imidazolidinone.

Compounds of Formula V include alkyl α-monochloroacetates and α-monobromoacetates, e.g. the methyl, ethyl, etc. ester, especially the methyl ester.

The compounds of Formula I are solid crystalline materials generally white or colorless when pure, and they are generally soluble in water and alcohols, especially methanol, ethanol, and isopropanol, in dimethylformamide, ethyl acetate, acrylonitrile, dimethylacetamide, and acetone.

Compounds of Formula I are useful as plasticizers, particularly with nylons of the polyamide type including that known as the 66 nylon, and also for vinyl resins, such as copolymers of vinyl chloride with vinyl acetate. The compounds of Formula I may be introduced into all sorts of formed structures, such as fibers, films, sheets, rods and other shaped structures, formed of various vinyl resins, such as copolymers of vinyl chloride with acrylonitrile or vinyl acetate, homopolymers of vinyl chloride, vinylidene chloride, or acrylonitrile, copolymers of vinylidene chloride with acrylonitrile or vinyl acetate or vinyl chloride, copolymers of acrylonitrile with vinyl acetate, vinyl pyridines, ethylene, isobutylene, and so on, by introducing from 2% to 10% by weight, on the weight of the film-forming polymer, in the melt, solution, or dispersion of the latter before its extrusion, casting, or molding into the final shaped product. The incorporation of the compounds of Formula I in this manner into formed vinyl resin structures serves various purposes including modification of the dyeing, which is particularly important in the production of fibrous materials from polymers of acrylonitrile containing 75% to 95% of the acrylonitrile with other comonomers. Another important purpose served by the introduction of the new compounds into various formed articles made from vinyl resins and especially the polymers of acrylonitrile just mentioned is the increase in moisture retention or moisture regain of the structures and also the reduction of the tendency to develop static electricity during spinning operations as in carding, drawing and twisting, weaving and knitting, and so on. The compounds of Formula I may also be included with glycerine or glycols to provide softening compositions for products, and especially pellicles, films, or sheets formed of regenerated cellulose and hydroxyethyl cellulose to enhance the slip characteristics of the sheets and to reduce blocking tendencies thereof.

The compounds of Formula I are also useful as modifiers in aminoplast resin-forming condensates generally, especially those of urea-formaldehyde and melamine-formaldehyde. In such case, a small amount of a free radical initiator of the types described hereinafter may be included to provide addition polymerization before, during, or after the thermosetting condensation reaction. In this connection, the new compounds take part in the thermosetting reaction by virtue of the reactivity of the hydrogen on the nitrogen of the heterocyclic ring with formaldehyde or with formaldehyde in conjunction with a lower alcohol from methyl through butyl that may be present in the aminoplast composition.

As a chemical intermediate, the compounds of the present invention are adapted to react at the double bond with various compounds including alcohols, mercaptans, primary or secondary amines, nitroalkanes, malonates, acetoacetates, sodium bisulfite, and so on. The addition of long chain amines or mercaptans, such as dodecylamine or mercaptan, provides compounds which are highly useful as water-proofing, softening and lubricating agents for textiles of all types and especially of cellulosic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although the compounds of Formula I have generally an appreciable solubility in water, these compounds may be copolymerized with water-insoluble monomers by an emulsion technique in which the comonomers and any excess of the compound of Formula I over the amount that is soluble in the water are emulsified by non-ionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl group has from 6 to 18 carbon atoms, such as octyl dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazole, and allyl esters of monocarboxylic acids. Specific vinylidene compounds are methyl, ethyl, isopropyl, butyl, tert-butyl, octyl, dodecyl, octadecyl, octenyl, or oleyl acrylates or methacryates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfiide, vinyl acetate, vinyl propionate, vinyl laurate, $\alpha$-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result, The homopolymers of compounds of Formula I are generally water-soluble. They are useful as sizes for paper, textiles and particularly as warp sizes. When introduced into paper pulps, they provide increased wet strength in the final dry paper containing them. For this purpose, there may be used from about 1% to 7% of a polymer of one of the compounds of Formula I on the dry fiber weight of the paper. They are useful as thickeners for various aqueous coating, adhesive, and film-forming compositions. The homopolymers are also useful as flocculants, especially useful in higher molecular weights of at least 20,000 to 50,000 to aid in the clarification of aqueous systems containing clays, or other finely divided materials, especially mineral matter as is produced in the grinding of ores. In this connection, they not only increase the settling rate but generally increase the rate of filtration. The homopolymers may be used in admixture with other materials, such as starch, gelatin, or plasticizers therefor to provide coatings or films, thickening materials, warp sizes or the like. The homopolymers with other film-forming materials, such as vinyl and acrylic resins, may be pigmented or dyed to provide decorative coatings on substrates, such as textile, leather, paper, wood or on metal or glass surfaces. The homopolymers are reactive with formaldehyde and the reaction product thereby obtained is also useful as an additive to paper pulps to provide increased wet strength in the final paper. The homopolymers, or their reaction product with formaldehyde, may be combined with aminoplast resin-forming condensation products, such as those of urea-formaldehyde or triazineformaldehyde condensates including melamine-formaldehyde. The inclusion of the homopolymers of the present invention serves to increase the toughness of the product and the water-resistance thereof when used in amounts of about 5% to 15%, based on the weight of the aminoplast condensate.

Copolymers containing a large proportion of the compound of Formula I have similar utilities to the extent that they are water-soluble as warp sizes, wet strength resins in paper, thickeners, and flocculants. However, copolymers containing from 5% to 20% by weight or more of the compounds of Formula I with various comonomers are adapted to provide valuable coating materials which may be pigmented or not and in the case of emulsion copolymers, they are adapted to provide valuable water-base paints. Copolymers containing from 5% to 20% by weight of a compound of Formula I with ethyl acrylate, butyl acrylate, or the like, are useful to reduce the shrinkage of wool. For this purpose, they may be applied in aqueous dispersions of a concentration from 10% to 30% so that from about 5% to 15% by weight of the copolymer is deposited on the wool fabric. After drying, the treated fabric may be heated to 240° F. to 350° F. from a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. In this connection, the heterocyclic group apparently exerts some chemical bonding action with the structure of the leather so as to provide good adhesion. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate or the like, serve to modify the dyeing properties of fibers and films formed therefrom.

In the following examples, which are illustrative of the present invention, parts are by weight unless otherwise noted:

EXAMPLE 1

*(a) N-[β-(α-chloroacetamido)ethyl]-N,N'-ethyleneurea*

A solution of 238.7 grams (2.2 moles) of methyl α-chloroacetate in 400 ml. of methanol in a 2-liter three-necked, round-bottomed flask equipped with stirrer, thermometer and dropping funnel is cooled to 0° C. with an ice-salt bath. To this is added at −8° to 0° C. in seven hours a solution of 258 grams (2.0 moles) of N-(β-aminoethyl)-N,N'-ethyleneurea in 200 ml. of methanol. The reaction mixture is stored overnight in the refrigerator and filtered to give, after rinsing with a little methanol and acetone and drying, 317.7 grams (a 77.3% yield based on the amine charged) of a white crystalline solid, N - [β - (α - chloroacetamido)ethyl] - N,N'-ethyleneurea, M.P. 123–125° C. Analysis.—Calculated for $C_7H_{12}N_3O_2Cl$:N, 20.4%; Cl, 17.3%. Found: N, 20.3%; Cl, 17.1%.

Recrystallization of 311 grams of the above product from methanol gives 277.3 grams of a white crystalline solid, M.P. 125–127° C. Analysis.—Found: N, 20.3%; Cl, 17.4%.

*(b) N-[β-(α-methacryloxyacetamido)ethyl]-N,N'-ethyleneurea*

A mixture of 51.4 grams (0.25 mole) of the product of part (a), 27 grams (0.25 mole) of sodium methacrylate, 1 gram of benzyltrimethylammonium chloride, and 250 ml. of acetonitrile is refluxed for eight hours in a 1-liter, three-necked, round-bottomed flask equipped with stirrer and condenser. The reaction mixture is filtered to remove 16.2 grams of white solid; the theoretical amount of sodium chloride is 14.6 grams. Then 0.1 gram of hydroquinone is added to the filtrate which is stripped by distillation at reduced pressure and in a 35° C. bath. There is obtained 84.4 grams of an almost white solid. Recrystallization from ethyl acetate gives 54.3 grams (an 85% yield) of N-[β-(α-methacryloxyacetamido)ethyl]-N,N'-ethyleneurea as a white, crystalline solid, M.P. 107°–108° C. Two recrystallizations from ethyl acetate yield 46.4 grams of a white, crystalline solid, M.P. 110°–111° C. Analysis.—Calculated for $C_{11}H_{17}N_3O_4$:C, 51.8%; H, 6.7%; N, 16.5%. Found: C, 51.8%; H, 6.98%; N, 16.25%; Cl, 0.10%.

Introduction of 7 parts of the product into 93 parts of a copolymer of 85% vinyl chloride and 15% of vinyl acetate dissolved in 350 parts of acetone, and casting the solution results in a film having increased moisture regain as compared to a film of the copolymer alone and the film shows less tendency to develop electrostatic charges on rubbing.

EXAMPLE 2

*N[β-(α-methacryloxyacetamido)ethyl]-N,N'-ethyleneurea*

A mixture of 205.5 grams (1 mole) of the product of Example 1(a), 108 grams (1 mole) of sodium methacrylate, 4 grams of benzyltrimethylammonium salicylate, and 1 liter of acetonitrile is refluxed for ten hours in a 3-liter, three-necked, round-bottomed flask equipped with stirrer and condenser. The reaction mixture is filtered to remove 66.4 grams of sodium chloride and unchanged sodium methacrylate. The theoretical amount of sodium chloride is 58.5 grams.

The filtrate and washings are combined and 0.1 gram of hydroquinone is added. Acetonitrile is removed by distillation at reduced pressure and in a 35° C. bath to give 303 grams of an almost white solid. Recrystallization from ethyl acetate yields 213.1 grams (84%) of N-[β-(α - methacryloxyacetamido)ethyl]-N,N'-ethyleneurea as a white crystalline solid, M.P. 109°–110° C. A second recrystallization from ethyl acetate gives 188.1 grams of a white, crystalline solid, M.P. 112°–114° C. Analysis.—Calculated for $C_{11}H_{17}N_3O_4$: N, 16.5%. Found: 16.2% N.

EXAMPLE 3

(a) A solution of 5 grams of the methacryloxyacetamidoethylethyleneurea of Example 1(b), 10 grams of water, 0.05 gram of mercaptoethanol and 0.1 gram of dimethyl azodiisobutyrate is heated in a glass vessel under nitrogen for sixteen hours at 65° C. The Gardner-Holdt viscosity of the resulting solution is I. The reaction mixture is poured into acetone to precipitate the polymer. The acetone layer is removed, and the residue is dissolved in a small amount of methanol and water. The polymer is reprecipitated with acetone and dried at 0.5 mm. Hg and room temperature for twenty hours. There is obtained 4.4 grams of poly(methacryloxyacetamidoethylethyleneurea) as a white, hard, hygroscopic solid.

(b) Similar treatment of a solution of 5 grams of the methacryloxyacetamidoethylethyleneurea of Example 1(b), 10 grams of dimethylformamide, 0.05 gram of mercaptoethanol, and 0.1 gram of dimethyl azodiisobutyrate yields 4.7 grams of the homopolymer. The Gardner-Holdt viscosity of the polymerization mixture is 0.

EXAMPLE 4

A solution of 4.3 grams (0.01685 mole) of the poly($\alpha$-methacryloxyacetamidoethylethyleneurea) of Example 3(a) and (b) in 4.3 grams of water and 4.3 grams of methanol is added slowly to a solution of 7.03 grams (0.0844 mole) of 36.0% aqueous formaldehyde in about 10 ml. of water at a pH of 8.5 to 9.0. The reaction mixture is heated at 65° C. for two hours. The total solids is determined and found to be 16.5% for 28.1 grams of resin solution.

This resin solution is applied to unbleached kraft pulp to provide various concentrations of the resin (referred to as resin A in the table) on the weight of fiber in the pulp with 3% alum (on fiber weight) at pH 4.5. After sheeting and drying, the papers are tested for wet tensile strengths and compared to similar sheets obtained with the same pulp and a commercial ureaformaldehyde resin. The wet tensile strengths of the paper sheets obtained are given in Table A.

TABLE A

| Conc. | Wet Tensile Strength (lbs./in.) | |
|---|---|---|
| | 4 Days | 28 Days |
| 0.25% Resin A | 8.1 | 7.1 |
| 0.50% Resin A | 10.2 | 9.0 |
| 1.0% Resin A | 13.8 | 12.4 |
| 0.5% Urea-formaldehyde | 6.3 | 6.6 |
| 1.0% Urea-formaldehyde | 7.9 | 8.8 |
| 2.0% Urea-formaldehyde | 10.6 | 11.8 |

EXAMPLE 5

(a) A mixture of 11.48 grams of N-[$\beta$-($\alpha$-methacryloxyacetamido)ethyl]-N,N'-ethyleneurea, 0.525 gram of 4-vinylpyridine, 24.01 grams of dimethylformamide, 0.048 gram of mercaptoethanol, 0.1 gram of dimethyl azodiisobutyrate is heated at 65° C. under nitrogen for sixteen hours. The polymerization mixture (Gardner-Holdt viscosity=X) is poured into acetone to precipitate the polymer. The polymer is dissolved in water, reprecipitated with acetone, and dried one day at 0.5 mm. Hg and room temperature to give 8.4 grams of an almost white, hard solid.

(b) A similar procedure is followed with 10.2 grams of the methacryloxyacetamidoethylethyleneurea prepared as in Example 1(b), 0.86 gram of methyl acrylate, 22.12 grams of dimethylformamide, 0.033 gram of mercaptoethanol, and 0.1 gram of dimethyl azodiisobutyrate. There is obtained 11.1 grams of a white solid copolymer of the methacryloxyacetamidoethylethyleneurea and methyl acrylate. Analysis.—Found: N, 14.3%; $OCH_3$, 2.4%.

(c) A copolymer of the methacryloxyacetamidoethylethyleneurea and acrylic acid is obtained in 88.7% conversion by subjecting to the above-described polymerization conditions 11.48 grams of the methacryloxyacetamidoethylethyleneurea of Example 1(b), 0.36 gram of acrylic acid, 23.68 grams of dimethylformamide, 0.0474 gram of mercaptoethanol, and 0.1 gram of dimethyl azodiisobutyrate. Analysis.—Found: N, 16.0%.

(d) A mixture of 11.48 grams of the methacryloxyacetamidoethylethyleneurea prepared as in Example 1(b), 1.05 grams of N-methyl-N-vinoxyethylmelamine, 25.06 grams of dimethylformamide, 0.0512 gram of mercaptoethanol, and 0.1 gram of dimethyl azodiisobutyrate is heated under nitrogen for sixteen hours at 65° C. The polymerization mixture has a Gardner-Holdt viscosity of V. Isolation in the usual manner yields 7.0 grams of a hard, almost white hygroscopic solid copolymer. Analysis.—Found: N, 16.9%.

(e) A solution containing 10.2 grams of the methacryloxyacetamidoethylethyleneurea, 2.65 grams of a mixture of lauryl and myristyl methacrylates, 25.7 grams of dimethylformamide, 0.0514 gram of mercaptoethanol, and 0.1 gram of dimethyl azodiisobutyrate is heated at 65° C. under nitrogen for sixteen hours. The polymerization mixture is poured into acetone to precipitate the copolymer. The acetone layer is removed, and the residue is dissolved in dimethylformamide, reprecipitated with acetone, and dried for twenty hours at room temperature and 0.5 mm. Hg pressure. There is obtained 8.4 grams of a hard, white solid copolymer. Analysis.—Calculated for copolymer of 80 mole percent $C_{11}H_{17}N_3O_4$ and 20 mole percent lauryl-myristyl methacrylate: N, 13.09%. Found: N, 13.4%.

(f) A polymerization mixture obtained as described in part (e) from 5.10 grams of the methacryloxyacetamidoethylethyleneurea, 7.95 grams of the mixed lauryl-myristyl methacrylate, 26.1 grams of dimethylformamide, 0.0522 gram of mercaptoethanol, and 0.1 gram of the same azoester is poured into methanol to precipitate the copolymer. The methanol is removed, and the residue is dissolved in benzene, reprecipitated with methanol, and dried at 0.5 mm. Hg and room temperature for one day. There is obtained 9.6 grams of a hard, white solid copolymer of 40 mole percent methacryloxyacetamidoethylethyleneurea and 60 mole percent lauryl-myristyl methacrylate. Analysis.—Calculated N, 6.45%. Found: N, 6.0%.

(g) A charge consisting of 12.7 grams (2.5 mole percent) methacryloxyacetamidoethylethyleneurea; 195.0 grams (97.5 mole percent) methyl methacrylate; 252.0 grams ethoxyethyl acetate (to make 45% sol. of monomers); and 0.52 gram (0.25%) azodiisobutyronitrile is put into a glass reaction vessel and heating and stirring is started under nitrogen. The solid monomer completely dissolves at ca 70° C. The reaction is held at 80° C. for four (4) hours and then recatalyzed with 0.26 gram of additional azodiisobutyronitrile in 60 grams of ethoxyethyl acetate. Stirring and heating is continued for an additional three (3) hours (total reaction time=seven (7) hours). The final resin solution is completely clear but is too viscous and is therefore diluted with additional ethoxyethyl acetate. It consisted of 650 grams of resin solution having 32.0% solids (100% conversion), a Gardner-Holdt viscosity of Z-5, a xylene tolerance greater than 22 cc. per 10 grams of resin solution, and an intrinsic viscosity—[$\eta$]—0.319. Coatings on wood, glass, and metal panels showed good clarity, adhesion, and film length.

EXAMPLE 6

A solution of 4.00 grams of the copolymer of Example 5(a) in 8.0 grams of water (Gardner-Holdt viscosity of solution=L) is added slowly to a solution of 6.48 grams of 34.7% aqueous formaldehyde in 31 grams of water at a pH of 8.5. The mixture is heated for two hours at 65° C. There is obtained 50 grams of a solution containing 8.55% solids.

This solution of resin (termed resin B in Table B) is applied at various concentrations together with 3% alum to unbleached kraft, bleached kraft, and bleached sulfite paper pulp at a pH of 4.0 to 4.5. The wet tensile strengths of the paper sheets obtained therefrom are determined and compared to those of standard urea-formaldehyde resins with the following results for twenty-eight day ageing.

TABLE B

| Conc. Resin | Wet Strength (lbs./in.) after 28 Days | | |
|---|---|---|---|
| | Bleached Sulfite | Bleached Kraft | Unbleached Kraft |
| 0.125% Resin B | | | 4.8 |
| 0.25% Resin B | | | 6.8 |
| 0.5% Resin B | | 4.1 | |
| 1.0% Resin B | 8.6 | 5.8 | |
| 0.5% Urea-formaldehyde | 4.3 | 2.9 | 3.8 |
| 1.0% Urea-formaldehyde | 5.6 | 4.1 | 6.4 |
| 2.0% Urea-formaldehyde | | 6.2 | 9.9 |
| 3.0% Urea-formaldehyde | | 6.8 | 11.9 |

EXAMPLE 7

(a) *N-[β-(α-acryloxyacetamido)ethyl]-N,N'-ethyleneurea*

A mixture of 57 grams of sodium acrylate, 51.4 grams of the chloroacetamidoethylethyleneurea obtained by the procedure of Example 1(a), 300 ml. of acetonitrile, and 1 gram of benzyltrimethylammoniumsalicylate is refluxed for sixteen hours in a 1-liter, three-necked, round-bottomed flask equipped with stirrer and condenser. The reaction mixture is filtered to remove 49.9 grams of white solid. The filtrate and washings are combined and 0.1 gram of hydroquinone is added. Acetonitrile is removed at reduced pressure on a 25°–30° C. bath to leave 62.0 grams of crude N-[β-(α-acryloxyacetamido)ethyl]-N,N'-ethyleneurea as a white solid. The theoretical yield is 60.3 grams. After two recrystallizations from ethyl acetate and one from acetone, there is obtained a white crystalline solid, M.P. 100°–102° C. Analysis.—Calculated for $C_{10}H_{15}N_3O_4$: N, 17.4%. Found: N, 17.1%.

EXAMPLE 8

A mixture of 10 grams of the acryloxyacetamidoethylethyleneurea, obtained by the procedure of Example 7, 20 grams of water, 0.04 gram of mercaptoethanol, and 0.1 gram of dimethyl azodiisobutyrate is heated in a glass vessel under nitrogen for sixteen hours at 65° C. The resulting solution has a Gardner-Holdt viscosity of Z. The reaction mixture is poured into acetone to precipitate polymer. The polymer is dissolved in a small amount of water, reprecipitated with acetone, and dried for twenty hours at 0.5 mm. Hg pressure and room temperature. There is obtained 8.9 grams of a hard, white solid, poly-(acryloxyacetamidoethylethyleneurea).

EXAMPLE 9

(a) *N-[3(α-chloroacetamido)propyl]-tetrahydro-2-pyrimidinone*

To a solution of 153.8 grams (1.41 moles) of methyl chloroacetate in 200 ml. of methanol is added in six and three-quarter hours at —7° to 0° C. with stirring a solution of 202.2 grams (1.29 moles) of N-(3-aminopropyl)-tetrahydro-2-pyrimidinone in 100 ml. of methanol. The reaction mixture is stored overnight in the refrigerator and then filtered to remove the product. After rinsing and drying there is obtained 162.5 grams (58%) of N-[3-(α-chloroacetamido)propyl]-tetrahydro - 2 - pyrimidinone as an almost white crystalline solid, M.P. 116°–118° C. Recrystallization from methanol yields 110.1 grams of a first crop of white, crystalline solid, M.P. 122°–124° C. and 13.1 grams of a second crop, M.P. 120°–122° C. Analysis.—Calculated for $C_9H_{16}N_3O_2Cl$: N, 17.98%; Cl, 15.2%. Analysis of first crop: N, 17.7%; Cl, 15.1%. Analysis of second crop: N, 17.9%; Cl, 15.2%.

(b) *1-[3-(α-methacryloxyacetamido)propyl]-tetrahydro-2-pyrimidinone*

A mixture of 58.4 grams (0.25 mole) of the product of part (a) hereof, 27 grams (0.25 mole) of sodium methacrylate, 1 gram of benzyltrimethylammonium chloride, 0.1 gram of hydroquinone, and 250 ml. of acetonitrile is refluxed for eight hours in a 1-liter, three-necked, round-bottomed flask equipped with stirrer and condenser. Filtration of the reaction mixture removes 16.2 grams of white solid; the theoretical amount of sodium chloride is 14.6 grams. A small amount (0.1 gram) of hydroquinone is added to the filtrate, which is then stripped at reduced pressure and 30°–35° C. to give 70.5 grams of an almost white solid. Two recrystallizations from ethyl acetate yield 1-[3-(α-methacryloxyacetamido)propyl]-tetrahydro-2-pyrimidinone as a white, crystalline solid, M.P. 86°–87° M. Analysis.—Calculated for $C_{13}H_{21}N_3O_4$: N, 14.7%. Found: N, 14.5%.

EXAMPLE 10

A mixture of 10 grams of the product of Example 9, 20 grams of water, 0.03 gram of mercaptoethanol, and 0.1 gram of dimethyl azodiisobutyrate is heated in a glass reaction vessel under nitrogen for sixteen hours at 65° C. The resulting polymerization mixture is poured into acetone to precipitate the polymer. The acetone layer is removed. The residue is dissolved in a small amount of dimethylformamide, reprecipitated with acetone, and dried at 0.5 mm. Hg pressure and room temperature for twenty-four hours. A quantitative yield of the homopolymer of 1-[3-(α-methacryloxyacetamido)-propyl]-tetrahydro-2-pyrimidinone is obtained. Analysis.—Calculated for $C_{13}H_{21}N_3O_4$: N, 14.7%. Found: N, 14.9%.

EXAMPLE 11

A solution of 2.83 grams of the homopolymer of Example 10 in 10 grams of water and 2.0 grams of methanol is added to a solution of 4.12 grams of 36.4% aqueous formaldehyde in 10 grams of water. The pH is adjusted to 8.5 during the addition. The mixture is heated at 65° C. for two hours. There is obtained 29.5 grams of an aqueous solution of a polymethylol derivative of the homopolymer. This resin, when introduced into an unbleached kraft pulp in an amount of 0.5% on the dry pulp weight with 3% of alum, which paper is sheeted, and dried, provides a paper of increased wet strength.

EXAMPLE 12

An aqueous dispersion containing 15% of an emulsion copolymer of a mixture of 5% by weight of the product of Example 9(b) with 95% by weight of n-butyl acrylate is applied to a wool fabric by padding, dried 10 minutes at 240° F. and cured at 300° F. for 10 minutes. The fabric shows reduced shrinkage on laundering without an appreciable change of hand.

EXAMPLE 13

A mixture of 273 grams of methyl methacrylate, 166.5 grams of butyl methacrylate, 25.4 grams of N-[β-(α-methacryloxyacetamido)ethyl] - N,N'-ethyleneurea, and 500 grams of ethoxyethyl acetate is heated in a glass vessel provided with a nitrogen atmosphere to 70° to 75° C. Then 4 grams of azodiisobutyronitrile is added while agitating. After the third and fifth hours at 75° to 80° C., solutions of 2 grams of the azodiisobutyronitrile in 50 grams of ethoxyethyl acetate are added. Three hours later, the reaction mixture is filtered giving a solu-

11 tion of the ternary copolymer having a Gardner-Holdt viscosity of Z6— at 42.2% solids.

EXAMPLE 14

A mixture of 352 grams of methyl methacrylate, 20.7 grams of acrylonitrile, and 25.4 grams of N-[β-(α-methacryloxyacetamido)ethyl]-N,N'-ethyleneurea is copolymerized in 500 grams of ethoxyethyl acetate as in Example 13 using the same initiator in the same proportions.

EXAMPLE 15

To the several solutions obtained of the ternary copolymers of Examples 13 and 14 and of the binary copolymer of Example 5(g), there is added 1% of oxalic acid and 20% of bis-(methoxymethyl)urea (based on copolymer weight) and then each of the resulting solutions is cast as a film on a glass panel and baked at 300° F. for 30 minutes. Clear, glossy coatings having a pencil hardness of 7H which are alkali-resistant and resist dissolution by ethoxyethyl acetate are obtained. When the coatings are formed from the copolymers without added urea derivative and without the oxalic acid, and baked at 300° F. for 30 minutes, clear, glossy films having a pencil hardness of 4H are obtained. The coatings may be pigmented and/or plasticized, such as by dibutyl phthalate, and applied directly on metal surfaces or over primers thereon to produce colored or white coatings of good hardness and toughness.

EXAMPLE 16

To a mixture of 9 parts by weight of N-[β-(α-methacryloxyacetamido)ethyl]-N,N'-ethyleneurea, 5 parts of methacrylic acid, 84 parts of methyl methacrylate, and 2 parts of a solution containing 55% formaldehyde in methanol (methyl Formcel) there is added 0.08 part of a 25% solution of acetyl peroxide in dimethyl phthalate and the resulting mixture is introduced between two glass plates in a mold and polymerized by heating at a temperature of 60° C. for 16 hours, one hour at 70° C., and one hour at 110° C.

The copolymer adhered tenaciously to the glass plates even after soaking the laminate in water for 24 hours, heating at 180° C. in a circulating air oven and cooling with solid carbon dioxide overnight. The latter treatment caused some shattering of the glass but no noticeable effect on the copolymer layer or its adhesion to the glass.

I claim:
1. A compound having the formula:

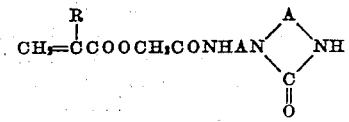

where R is selected from the group consisting of hydrogen and methyl, and A is an alkylene group having 2 to 3 carbon atoms.

2. N-[β-(α-methacryloxyacetamido)ethyl] - N,N'-ethyleneurea.

3. N-[β-(α-acryloxyacetamido)ethyl] - N,N'-ethyleneurea.

4. 1 - [3 - (α-methacryloxyacetamido)propyl] - tetrahydro-2-pyrimidinone.

5. 1 - [3-(αacryloxyacetamido)propyl] - tetrahydro-2-pyrimidinone.

6. A method of producing a compound as defined in claim 1 which comprises reacting a compound of the formula $CH_2=C(R)COOY$ with a compound of the formula

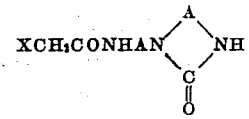

where R is selected from the group consisting of hydrogen and methyl, A is an alkylene group having 2 to 3 carbon atoms, Y is a metal selected from the group consisting of silver and the alkali metals, and X is selected from the group consisting of chlorine and bromine.

References Cited in the file of this patent

UNITED STATES PATENTS

| | | |
|---|---|---|
| 2,373,136 | Hoover et al. | Apr. 10, 1945 |
| 2,437,683 | Curd et al. | Mar. 16, 1948 |
| 2,686,772 | Bortnick | Aug. 17, 1954 |
| 2,694,696 | Melamed | Nov. 16, 1954 |